United States Patent [19]
Donze

[11] Patent Number: 4,809,956
[45] Date of Patent: Mar. 7, 1989

[54] GAS TORCH WITH ARTICULATED AND EXTENDABLE BODY

[76] Inventor: Michel Donze, La Flie B.P. 51, 54460 Liverdun, France

[21] Appl. No.: 129,297

[22] Filed: Dec. 7, 1987

[30] Foreign Application Priority Data

Dec. 23, 1986 [FR] France .................. 86 18065

[51] Int. Cl.$^4$ .............................................. B23K 7/10
[52] U.S. Cl. ........................................ 266/48; 266/62; 266/72
[58] Field of Search ........................... 266/48, 62, 72

[56] References Cited

U.S. PATENT DOCUMENTS 1,431,650 10/1922 Godfrey ............................. 266/62
1,582,033  4/1926 Godfrey ............................. 266/62

*Primary Examiner*—Wayland Stallard
*Attorney, Agent, or Firm*—Griffin, Branigan & Butler

[57] ABSTRACT

A gas torch comprises a body with at a first end adjuster valves for connection to fluid supplies and at a second end a torch tip. At the first end there is a support from which the body extends to the tip. The body is made up of sections of rigid tube articulated and connected to each other by articulation and fluid passage connection devices. These ensure continuity of fluid circulation between the sections of tube. The sections of tube near the support are articulated to the support by articulation and fluid passage connection devices enabling them to be connected to the valves. Maneuvering means are articulated to the supports and to at least the sections of tube near the support so as to enable remote displacement of the tip. The tip is supplied with fluid by some at least of the articulated sections of tube constituting the body.

10 Claims, 6 Drawing Sheets

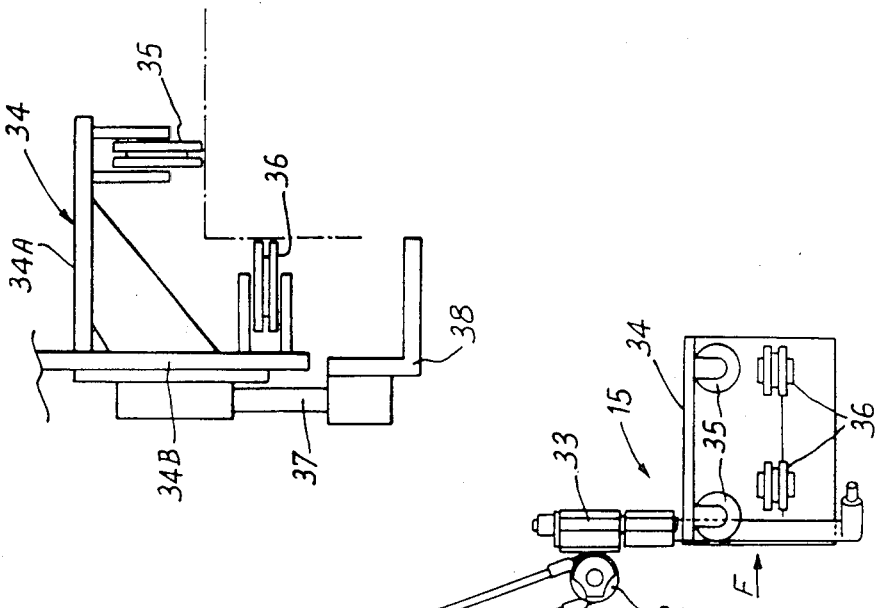
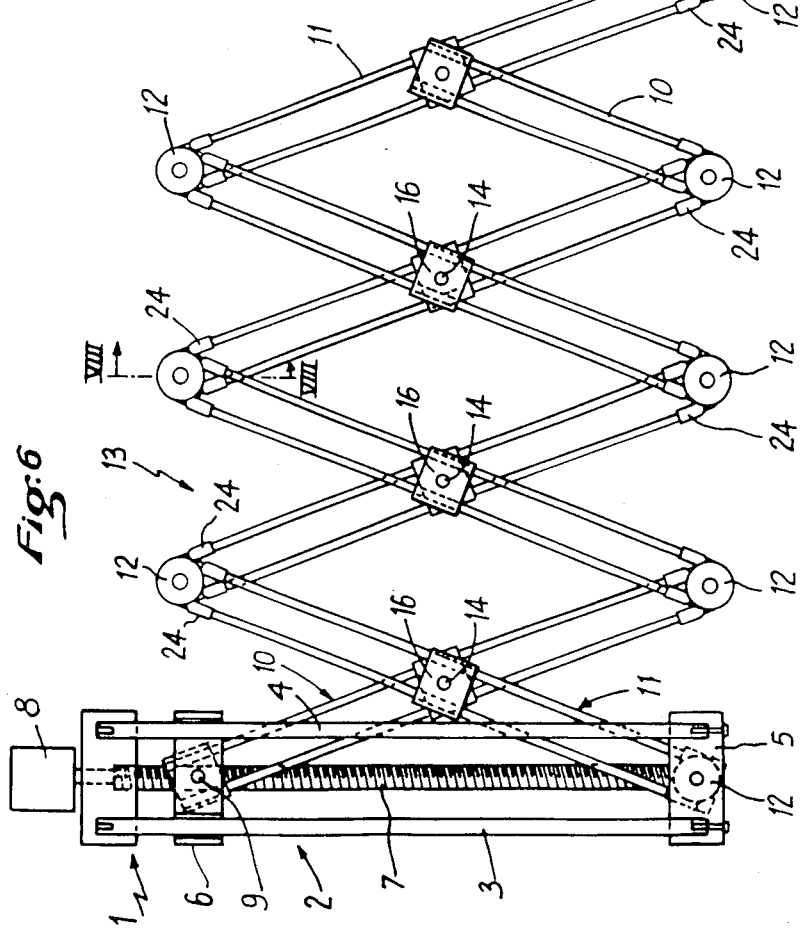

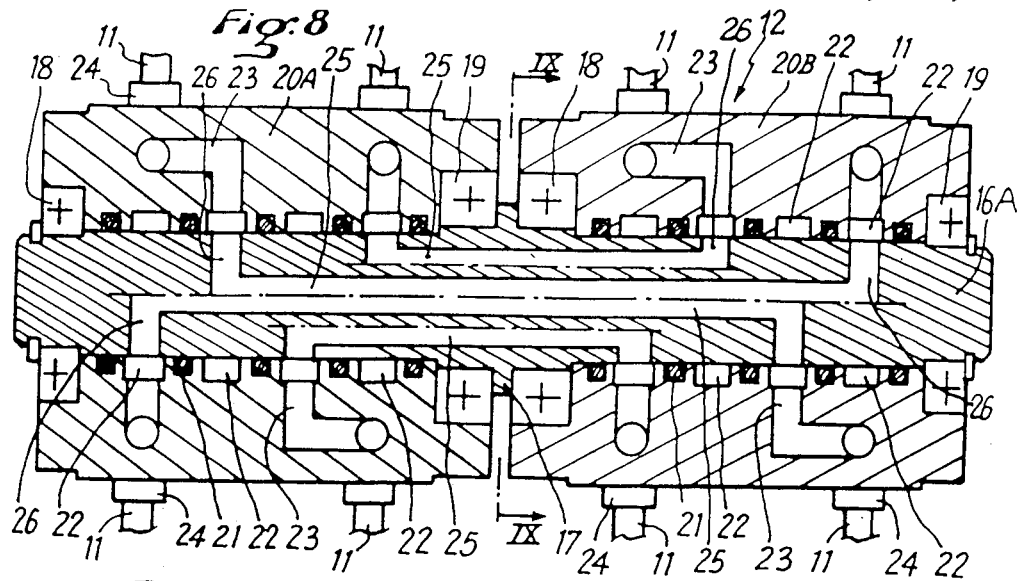
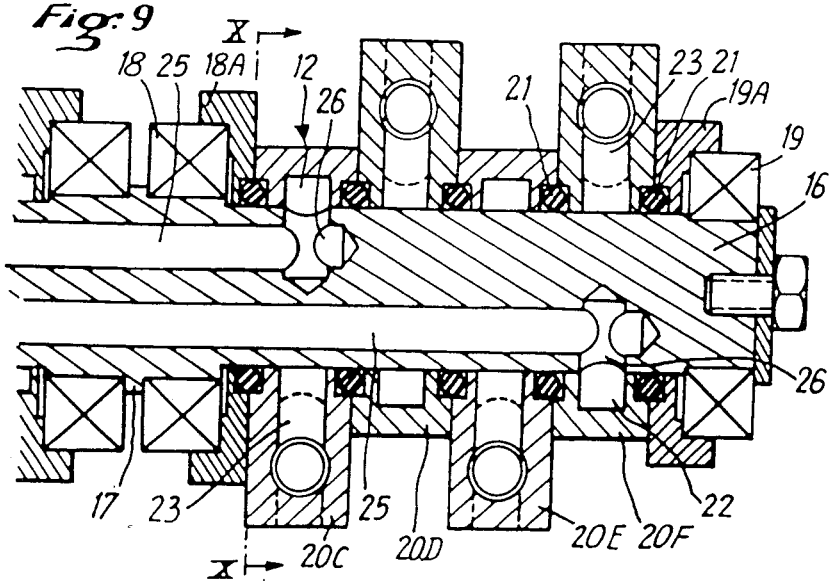
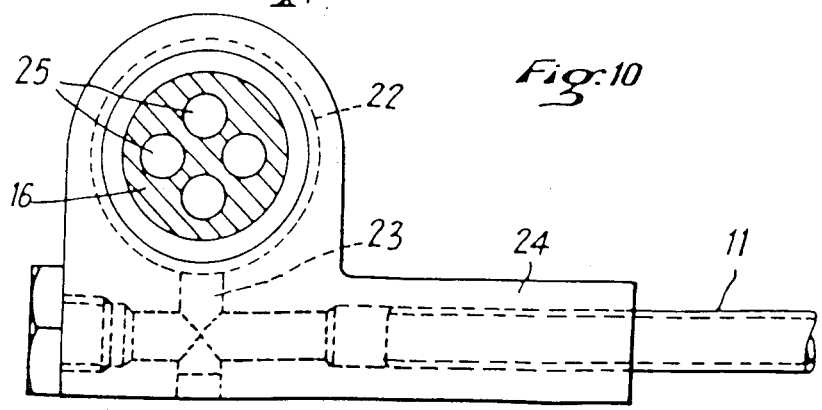

GAS TORCH WITH ARTICULATED AND EXTENDABLE BODY

BACKGROUND OF THE INVENTION

1. Field of the Invention

The invention concerns a gas torch with an articulated and extendable body enabling remote execution of various tasks using the flame produced by the tip of the torch.

2. Description of the Prior Art

A conventional gas torch comprises at one end a tip provided with a nozzle at which the flame is formed and at the opposite end terminations for connection to flexible gas supply hoses; on the output side of these terminations are valves for adjusting the flowrate of each gas. Between the valves and the tip lies the body of the torch which comprises rigid tubes through which the gases are conveyed to the tip.

SUMMARY OF THE INVENTION

In a gas torch in accordance with the invention there is at one end of the body a support with which are associated the adjuster valves and at a second end the tip of the torch and between the two ends the body comprises a series of sections of rigid tube successively articulated and joined to each other by articulation and fluid passage connection devices; the sections near the support are articulated to the latter by articulation and fluid passage connection devices which connect them to the corresponding valves; the sections near the tip of the torch are preferably articulated to the latter by articulation and fluid passage connection devices connecting them to the tip; means for maneuvering the successive articulated sections are mounted on the support and articulated to the latter and at least to the sections of the tube near the support.

The invention does not impose any limitation on the numerous possible configurations of the sections of rigid tube articulated to each other.

According to one aspect of the invention the sections of tube are disposed in succession and are articulated to each other at their ends; maneuvering means are mounted between the support and each of the successive sections.

In accordance with another aspect of the invention, the sections of tube constitute a series of first branches following on from each other and a series of second branches following on from each other assembled into deformable parallelograms and articulated in their central part by means of pivot pins and at their ends by means of articulation and fluid passage connection devices in at least one of the series of branches; guide means and displacement means are associated with the support and the sections near the support of at least one of the series of branches are articulated by articulation connection devices with a mobile element moved along the guide means by the displacement means whereas the sections near the support of the other series of branches are articulated with an articulation element, preferably fixed in position, by articulation and fluid passage connection devices which connect them to the corresponding valves; the sections of tube near the tip of the torch in said other series of branches are articulated with the latter by articulation and gas passage connection devices which connect them to the tip.

Each articulation and gas passage connection device may comprise a rotary joint associated with short flexible hoses connecting together the sections of tube which are joined by the rotary joint to enable the passage of fluid.

Each articulation and gas passage connection device preferably comprises a rotary joint with internal passages ensuring continuity of circulation and having terminations for connection sections of tube which are joined by the rotary joint; each connection device of this kind placed between the sections of tube and the valves corresponding to the latter comprises rigid tubes or, if preferred, short flexible hoses connecting the valves and the terminations of said rotary joints.

If required, each branch may comprise a plurality of parallel tube sections constituting the equivalent number of separate networks for feeding a plurality of fluids to a plurality of torch tips or to convey a cooling fluid to the area where the torch tip or tips is or are functioning. In this case the articulation connection devices comprise flexible hoses or separate channels ensuring continuity of the respective separate gas circulation networks.

In one embodiment of the invention the torch further comprises a carrier member having guide means and translation displacement means; the support mentioned hereinabove is mounted on this carrier member to be guided and displaced by the guide means and the displacement means.

In a preferred embodiment of the invention the torch further comprises a base equipped with a shaft and the carrier member is mounted on this shaft so as to pivot about the axis thereof.

The invention will now be described by way of non-limiting example only with reference to the appended diagrammatic drawings.

BRIEF DESCRIPTION OF THE DRAWINGS

FIG. 6 is a partial view of a gas torch as in FIGS. 1 through 4 showing only the articulated and extendable body and guide means for the tip of the torch.

FIG. 7 is a partial view in the direction of the arrow F in FIG. 6.

FIG. 8 is a view in cross-section on the line VIII—VIII in FIG. 6.

FIG. 9 is a view in cross-section analogous to FIG. 8 showing a practical implementation of a rotary joint with internal passages.

FIG. 10 is a view in cross-section on the line X—X in FIG. 9.

DESCRIPTION OF THE PREFERRED EMBODIMENTS

Figure 1:
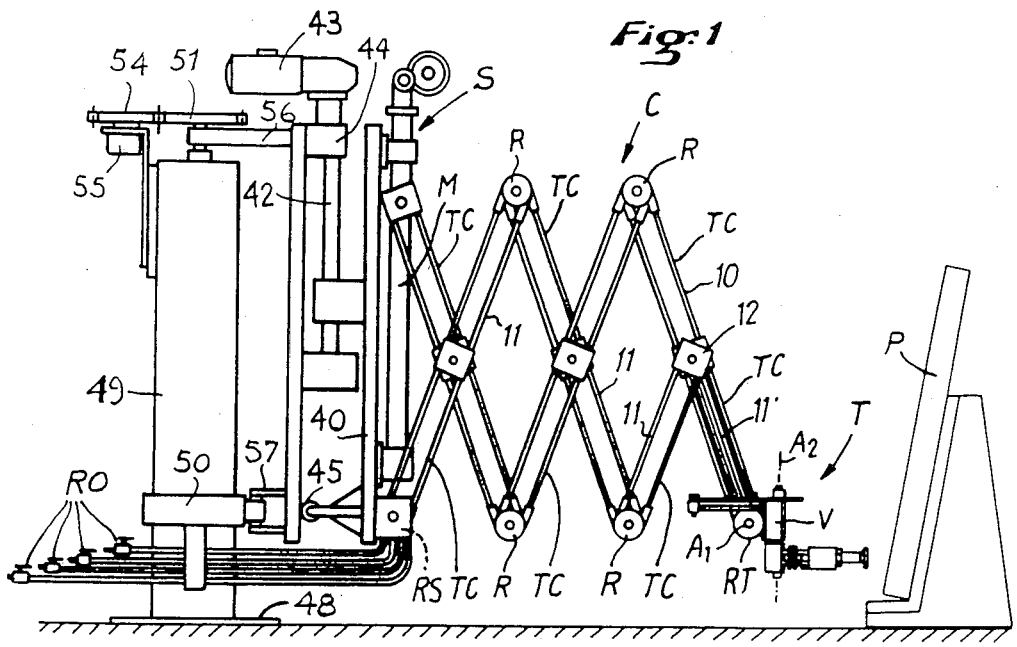
FIG. 1 is a general view of a gas torch in accordance with the invention in use on a workpiece represented in thinner outline.
Figure 5:
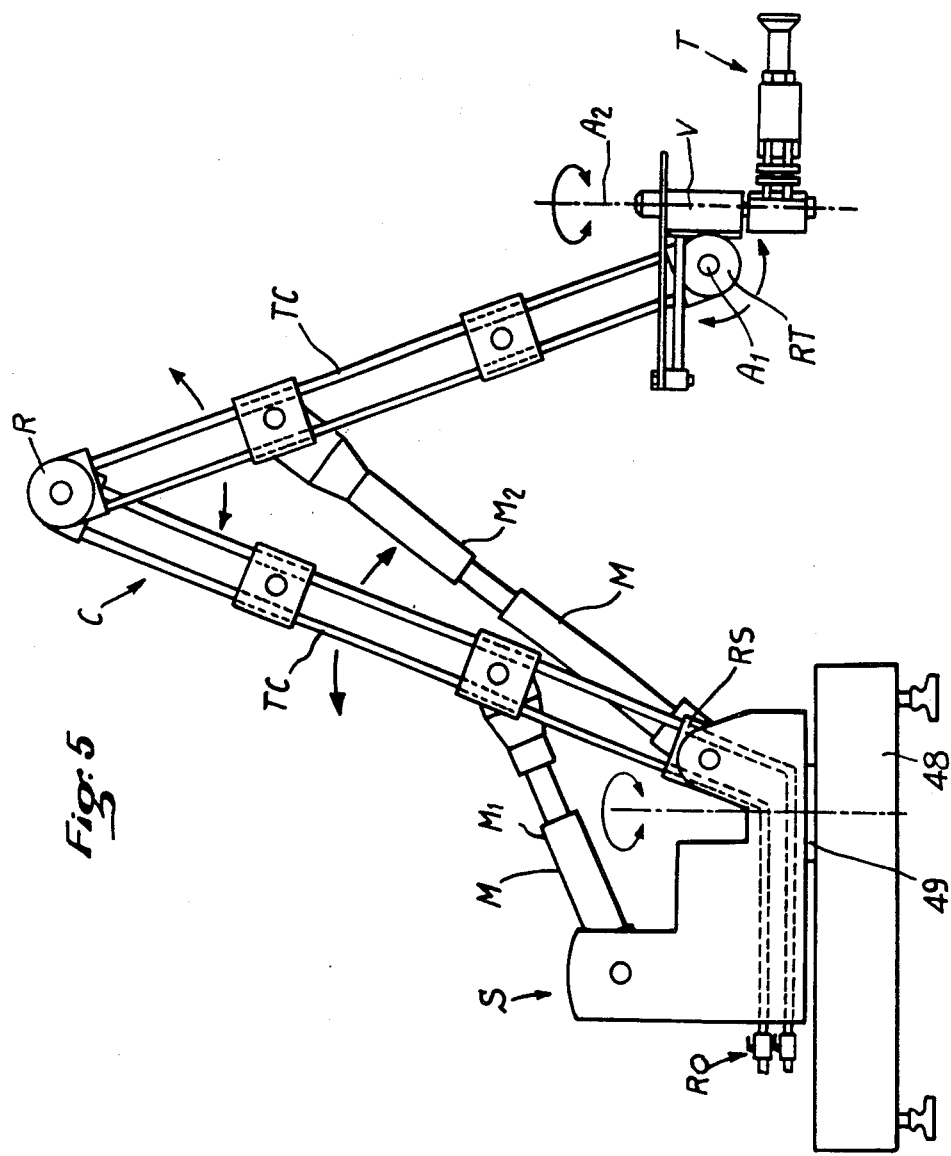
FIG. 5 is a view in elevation of another embodiment of a gas torch in accordance with the invention.

FIGS. 1 and 5 show that a gas torch in accordance with the invention comprises at a first end a support S which carries valves RO serving to connect the torch to various kinds of gas or fluid supply and to adjust the flowrate of the gases or fluids. At a second end there is at least one torch tip T which is preferably equipped with an interchangeable nozzle, in the known way. Between these two ends is the body C of the torch which is made up of at least one series of sections of rigid tube TC which are articulated to each other and which are connected to each other in succession by means of articulation and fluid passage connection means R.

The sections of rigid tube TC near the support S are articulated to the latter by an articulation and fluid passage connection means RS which connects them to the valves RO through the intermediary of fixed tubes.

The sections of rigid tube TC near the tip T of the torch are articulated to the latter by an articulation and fluid passage connection device RT which connects them to the head T.

Maneuvering means M for maneuvering the successive articulated sections TC are mounted between the support S and the consecutive sections TC (FIG. 5) or between the support S and the sections TC nearest the latter and capable of transmitting their movement to the subsequent sections TC (FIG. 1).

Figure 4:
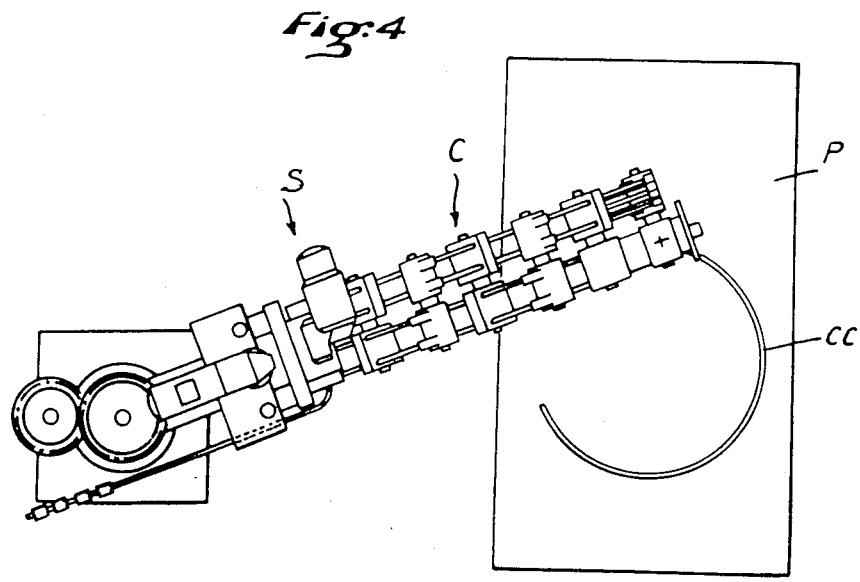

FIGS. 1 and 4 show that different configurations of the consecutive articulated sections TC can be adopted in the context of the invention.

With an articulated and extendable body torch in accordance with the invention it is possible to execute tasks on a workpiece P using the flame produced at the tip T with movements of the latter remotely controlled and the flowrates of the fluids remotely adjusted, as clearly shown in FIGS. 1 through 4. The articulated and extendable body may have dimension and mechanical strength properties enabling the tip T to function at a considerable distance from the valves RO, in a hazardous or congested environment where a man could not work or could only work for a limited time using a conventional rigid body gas torch.

Figure 3:
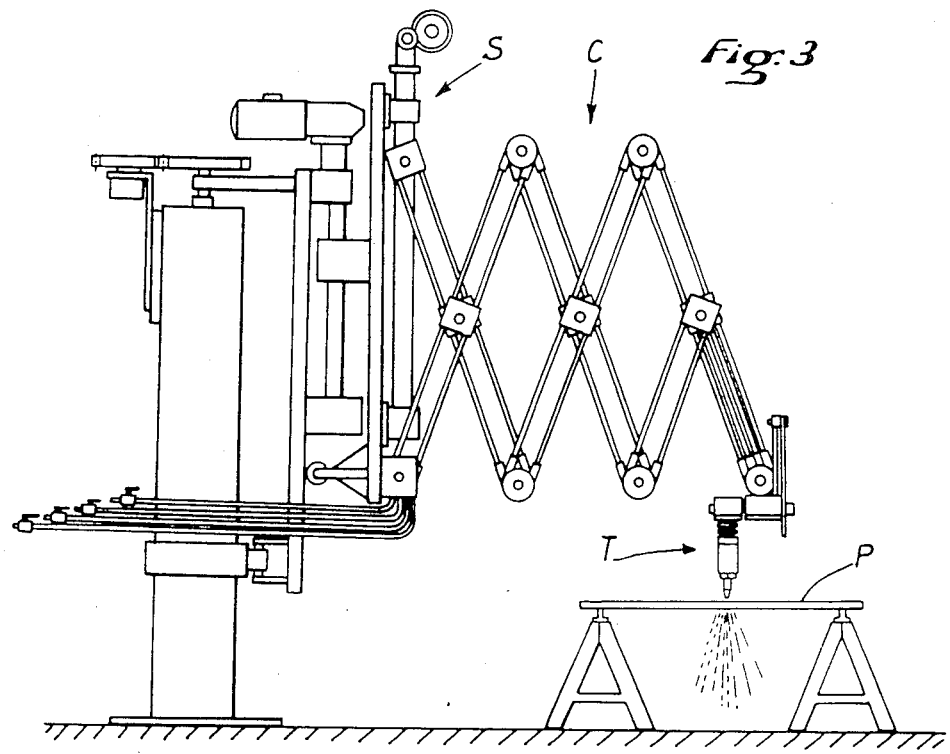
FIGS. 3 and 4 are respectively elevation and plan views of a gas torch from FIGS. 1 and 2 used for another type of flame task.

In FIGS. 3 and 4 the torch in accordance with the invention is executing a circular cut CC in a workpiece P by virtue of the flexibility of the articulated body controlled by the maneuvering means to be described later.

In FIG. 5 the articulated body comprises two branches in succession and each is coupled to the support S and a respective piston-and-cylinder actuator $M_1$, $M_2$. These are of known conventional type and each is supplied with a fluid under pressure by conventional means (not shown).

In all cases, irrespective of the configuration of the articulated and extendable body C, the gases and/or fluids necessary for execution of the task are conveyed by the body itself without using flexible hoses or using only extremely short flexible hoses.

A detailed description of the embodiment shown in FIGS. 1 through 4 will now be given.

With this configuration of the articulated and extendable body, the gas torch in accordance with the invention comprises a support 1 (FIG. 6) which may be fixed or mobile and guide means 2 consisting of two parallel bars 3, 4 fixed at one end to the support 1 and joined at their opposite ends by an articulation element 5. The guide means 2 carries a movable element such as a slider 6 mounted to slide along the parallel bars 3, 4. Displacement means consisting of a long screw 7 extend between the bars 3, 4 and through a nut (not shown) which forms part of the slider 6. One end of the screw 7 is guided in the support 1 where it is rotationally coupled to an electric motor 8 and its opposite end is guided in the articulation element 5.

The slider 6 is articulated by means of pivot pin 9 to one end of a branch 10 whereas the articulation element 5 serves as a fixed position articulation element for the end of another branch 11. The latter is articulated to the articulation element 5 through the intermediary of an end rotary joint 12, however.

The branches 10, 11 form part of the articulated and extendable body C of the torch. The combination of the branches 10, 11 is designated here by the general reference number 13 and extends from the support 1. This set of branches 13 is made up of numerous branches analogous to the branches 10, 11 assembled and articulated into lozenge shapes. The two branches 10, 11 cross in their central part where they are articulated by means of a pin 14. A distinction can be drawn between a series of first articulated branches 10 in sequence and a series of second articulated branches 11 in sequence. The branches in sequence are articulated to each other by articulation and fluid passage connection devices consisting of rotary articulation joints 12. The invention does not impose any limitation as to the number of branches in sequence in this way. The set of branches 13 ends with two branches of which the branch 10 is interrupted at its mid-point beyond its articulation to the other branch 11 by the pin 14. The other branch 11 is provided at its free end with an end rotary joint 12 through the intermediary of which it is joined to the tip 15 of the torch.

The branches 10 and 11 are each made up of one or more sections or lengths of tube that will be referred to hereinafter for simplicity as tubes. Four tubes are disposed in two parallel pairs which pass one on each side of each articulation pin 14. The latter passes through mounting plates 16 which hold together the four tubes of each branch 10 or 11.

Reference will now be made to FIG. 8 in order to describe one embodiment of a rotary articulation joint 12. This comprises a central shaft 16A which has an annular collet 17 in a median transverse plane. On each side of the latter are mounted by means of ball bearings 18, 19 so as to be freely rotatable respective sleeves 20A, 20B. Each sleeve is mounted on the central shaft 16A in a way that is rendered fluid-tight by a plurality of O-ring seals 21 accommodated in appropriate grooves. Annular grooves 22 are formed in the inside surface of the sleeves 20A, 20B, preferably between two grooves containing O-rings 21. To each annular groove 22 there corresponds in each sleeve an internal passages 23 in the sleeve and each passage 23 terminates at terminations 24 on the longitudinal lateral surface of the sleeve at an external connection termination extending radially out of the sleeve. The terminations 24 are more clearly visible in FIG. 1; FIG. 1 also shows that the tubes 10, 11 are joined by their opposite ends to two connection terminations 24. Inside the central shaft 16 are formed longitudinal passages 25 which extend to either side of the annular collet 17 and the opposite ends of which are connected by a respective radial passage 26 to an annular groove 22 in the respective sleeve 20A, 20B. In this way communication between the tubes which are joined by the articulation joints 12 is maintained through these joints. FIG. 3 relates to an example in which each branch 10 is made up of four tubes which are disposed in pairs in two parallel planes that are perpendicular to the central shaft 16A and which terminate at the sleeve 20A; the branches 11 thus comprise four tubes which are also disposed in pairs in two parallel planes that are perpendicular to the central shaft 16A.

The invention does not impose any limitations as to the number of tubes that constitute the articulated branches 10, 11. In the simplest case each branch 10, 11 could comprise only one tube; there would then be only one annular groove 22 in each of the sleeves 20A, 20B and only one longitudinal passage 25 in the central shaft 16A. Adapting the rotary articulation joints 12 to suite different numbers of tubes is a simple matter on the basis of the explanation given hereinabove.

When there are four tubes in a branch, these tubes may supply the tip 15 of the torch with four fluids from four circuits: a combustible gas (acetylene or propane) circuit, a low-flowrate oxygen circuit, a high-flowrate oxygen circuit and a cooling water circuit.

Where a succession of branches like the first branches 10 of FIG. 6 is not used to supply fluid to the torch tip, or even a plurality of torch tips 15, the tubes may be replaced by solid rods, although this has no particular advantage and also the disadvantage of increasing the weight.

When the slider 6 is moved by the screw 7 the articulated branches close up or spread out in the way that is well known, according to the direction the slider 6 moves, and this alters the length of the combination 13 continuously. Thus displacement of the torch tip 15 can be remotely controlled.

In one embodiment the articulation element 5 could be mounted to slide on the parallel bars 3, 4 and have the screw 7 pass through it in order to engage with it, this screw having in the known way two threads of opposite pitch so as to impose on the articulation element 5 movements conjugate to those of the slider 6 and in the opposite direction.

The end rotary joints 12 serve to connect the tubes of the torch body to fluid supplies at the end of the set 13 of branches near the support 1, on the one hand, and to the torch tip 15 at the end of the set 13 remote from the support 1, on the other hand.

The preferred embodiment of a rotary articulation joint 12 shown in FIGS. 9 and 10 is similar to that of FIG. 8. For this reason identical parts have been designated by the same reference numbers. The principal difference as compared with the embodiment shown in FIG. 8 is that the sleeves 20A, 20 B of the latter figure are replaced by an assembly of individual plates 20C, 20D, 20E, 20F the number of which on each side of the annular collet 17 is equal to the number of tubes constituting each branch 10, 11. These plates 20C through 20F are stacked on the central shaft 16A and prevented from moving axially along the latter on either side of the annular collet 17. Thus at each rotary joint 12 the total number of plates is twice the number of tubes constituting each branch. FIG. 9 shows only the half of the rotary joint 12 situated to the righthand side of the collet 17 when looking at the figure; the other half is symmetrical relative to the collet 17. The grooves provided for the O-ring seals 21 are formed with a part in each of the two facing lateral plane surfaces of the plates 20C to 20F so as to constitute complete grooves each containing an O-ring 21 when the plates are in contact through their lateral plane surfaces. End washers 18A and 19A are associated with ball bearings 18, 19 to contain the plates 20C through 20F between them and they also feature complementary half-grooves to contain O-ring seals.

Each plate 20C through 20F has the configuration shown in FIG. 10, largely cylindrical with a connection termination 24 incorporated in it tangentially to the whole. Inside each plate 20C through 20F is an annular groove 22 which is connected by an internal passage 23 to the internal passage of the termination 24. Into the latter is fixed, by screwing, for example, the end part of a tube of a branch 10 or 11.

The central shaft 16A is identical to that from FIG. 8 with radial passages 26 which connect the annular groove 22 of each plate 20C through 20F respectively to a longitudinal passage 25. Only two longitudinal passages 25 are shown in FIG. 9 to make the drawing clearer.

The advantage of this embodiment is that the plates 20C through 20F are identical and enable use of branches 10, 11 with any number of tubes; only the length of the central shaft differs according to the number of plates stacked on it along its length. One ballbearing 18 bears against the central collet 17 and the other bearing 19 is immobilized axially by known means. With this kind of assembly the tubes of the branches 10, 11 are no longer grouped in pairs in a common plane perpendicular to the central shaft 16A since there is only one tube corresponding to each plate 20C through 20F, as shown in FIG. 9.

Figure 11:
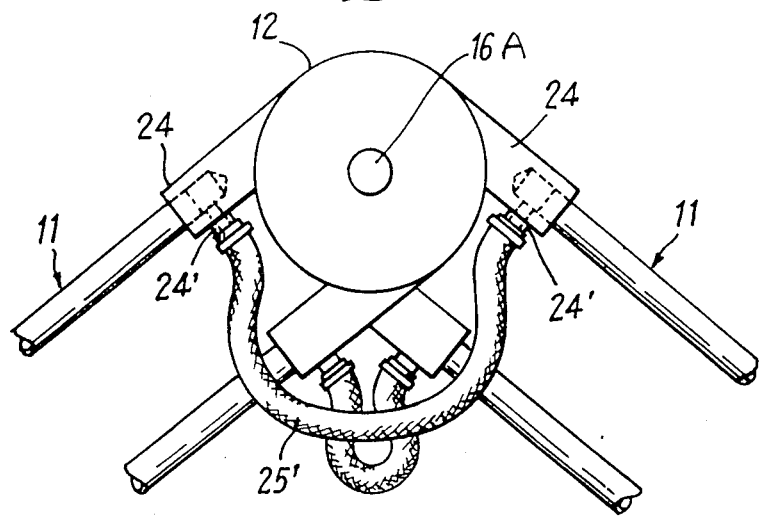
FIG. 11 is a partial view in perspective showing an embodiment of a rotary joint using flexible hoses.

FIG. 11 relates to one embodiment of articulation and fluid passage connection means. In this embodiment the central shaft 16A exists, as previously described, to provide mechanical articulation of the branches 11 but there is no hollow passage within the central shaft 16A. Each termination 24 which serves to mount a tube forming part of a branch 11 has a secondary lateral termination 24' which communicates internally with the housing into which is fixed the end of the tube of the branches 10, 11. Continuity of circulation of fluid between the two consecutive tubes 11 is provided by a short flexible hose 25' which joins two secondary lateral terminations 24' and which plays externally the same role as the internal passages 25, 26 in FIGS. 8 and 9. FIG. 11 shows only one flexible hose 25' to make the drawing clearer.

This embodiment can also be used for the end connectors for the connection to the valves RO and to the torch tip T. It is not a preferred embodiment since it comprises flexible hoses, although each of these is extremely short. It will be noted that the articulation and fluid passage connection device using an external flexible hose is suitable with a torch body C having any configuration.

The tip 15, fitted to the remote end of a branch 11 may be of any type appropriate to the flame task to be executed. FIGS. 1 and 6 show just one specific example of a torch tip. In FIG. 6 there is at the torch tip 15 a shaft 33 to which is fixed a bracket 34 having two wings 34A, 34B each equipped on its inside surface with a respective pair of spaced rollers 35, 36. The rollers 35, 36 are designed to roll on two adjacent surfaces of a workpiece (part of which is shown in chain-dotted outline in FIG. 7). A rod 37 is attached to the outside surface of the wing 34B; one end of it extends beyond the bracket 34 and is provided with a support 38 for the tip proper which is connected to the branches 11 through the intermediary of the end rotary joint 12.

Figure 12:
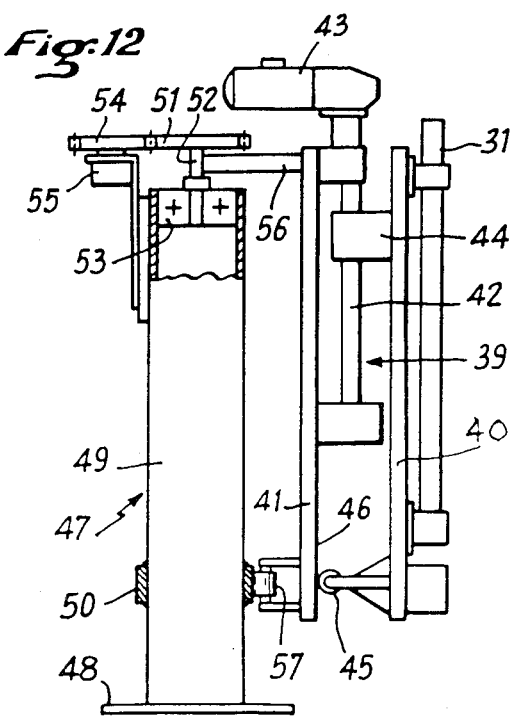
FIG. 12 is a partial view partly in cross-section of the base and the carrier member which complement the articulated and extendable body of FIG. 6 to provide the gas torch of FIG. 1.

Reference will now be made to FIG. 12 in order to describe the part of the torch from FIGS. 1 through 4 which complements the part shown in FIG. 6. FIG. 12 does not show the valves RO or the tubes which terminate at the end rotary joint near the support S, to make the drawing clearer.

In FIG. 12, and as also partially shown in FIG. 1, a casing 31 protects the support 1 and is attached to a carrier member 39. The latter comprises a first plate 40 to which the casing 31 is fixed and a second plate 41 parallel to the first plate 40. The second plate 41 carries a screw 42 rotationally coupled to a motor 43; the screw 42 meshes with a nut 44 fixed to the first plate 40; the latter is further provided on its side facing towards the second plate 41 with at least one roller 45 which rolls on a rolling track 46 on the second plate 41. This rolling track 46 serves as translation guidance means for the casing 31 on operation of the displacement means consisting of the screw 42 and the nut 44. Thus the support 1 and the torch are displaced parallel to the longitudinal dimension of the support 1.

The carrier member 39 is mounted on a base 47 which comprises a plinth 48 to which is fixed one end of the hollow cylinder 49 coaxially with the rolling track 50 (also see FIG. 5). This is parallel to the support 1 and carries a circular rolling track 50 at one end; its opposite end is fitted with a toothed wheel 51 keyed to rotate with a shaft 52. This is mounted to rotate freely within the hollow cylinder 49 by means of a ball bearing 53. The shaft 52 projects out of the hollow cylinder 49 to carry the toothed wheel 51. This meshes with a gearwheel 54 which is mounted on the shaft of a motor 55 supported on the side of the hollow cylinder 49. The projecting part of the shaft 52 is rigidly attached by an arm 56 to one end of the second plate 41 whose other end is provided with a roller 57 which is held against the circular rolling track 50. The roller 57 is held in contact with the circular rolling track 50 by the effect of gravity when the hollow cylinder 49 is placed vertically with the toothed wheel 51 at the top.

Figure 2:
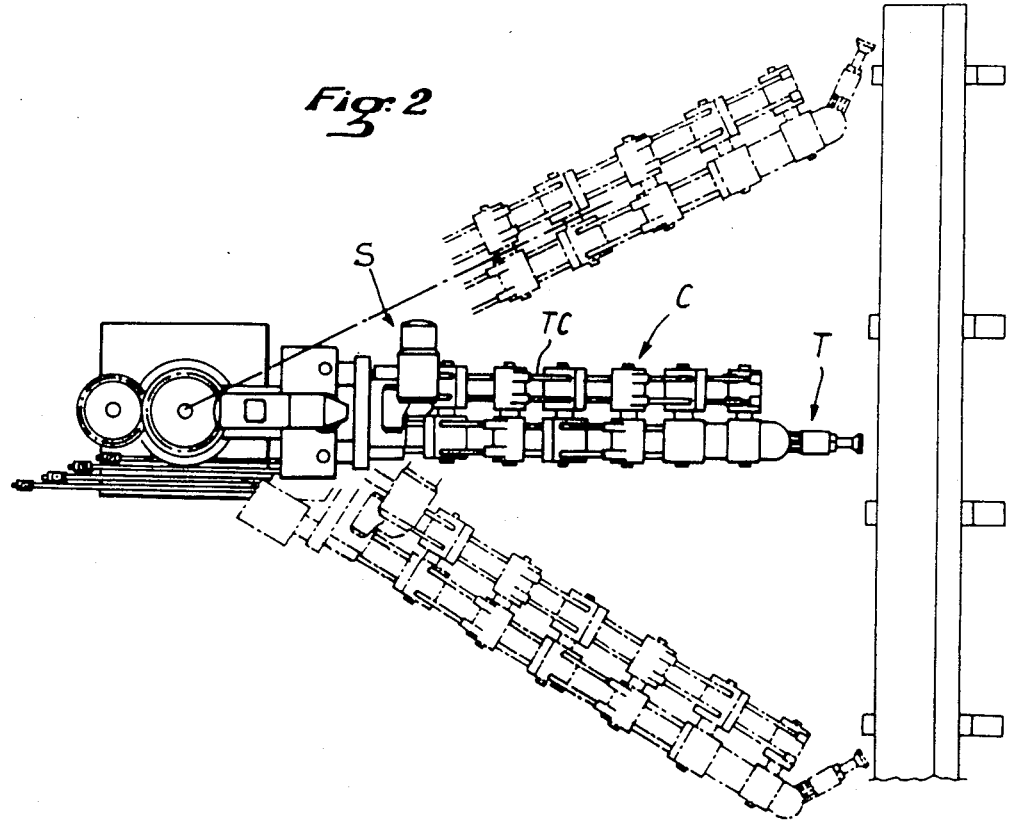
FIG. 2 is a plan view of the same gas torch showing in full outline a central position and in chain-dotted outline two extreme positions.

With a torch in accordance with the invention the tip that the articulated and extendable body carries can be moved in the sense of extension and retraction of the body as explained hereinabove, in the direction of rectilinear reciprocating movement of the nut 44 along the screw 42, and in the direction of circular movement of the roller 57 about the hollow cylinder 49 when driven by the motor 55, as shown by FIGS. 2 and 4.

There is an intentional difference between FIGS. 1, 3 and 6 regarding to the number of branches 10, 11 of the articulated body. In FIG. 6 there are four consecutive sections of tube in the branches 11 between the support 1 and the tip T so that these branches terminate directly at the tip T. In FIGS. 1 and 3 there are only two and a half sections of tube in the branches 11. Because of this, from the articulated crossing point of the branches 10, 11 near the tip T half-lengths of tube 11' extend to the tip T to supply the latter. In this case the branches are articulated by an articulation and fluid passage connection device analogous to a rotary joint 12 to ensure continuity of circulation between the branches 11 and 11'.

In FIGS. 1 through 5 the torch tip T can be turned about two orthogonal axes $A_1$, $A_2$ by means of two rotary actuators V (only one of which can be seen) supplied with fluid under pressure via the branches of the articulated body C.

In one embodiment the tip T could be fixed to the end of one of the branches 10, 11 without any articulated connection device and without any means of maneuvering the tip. A torch of this kind would be of very limited application, however.

It is clear that other manipulation means known in themselves may be employed to carry and move the support 1 which forms part of the torch. In FIG. 5, for example, the support S comprises only a plinth 48 and a cylinder 49, turning about the geometrical axis of the latter.

The torch in accordance with the invention, primarily when it is an oxycutting torch, makes it possible to work remotely in demanding locations and in environments hazardous to personnel and to the flexible hoses, since the fluid is fed to the torch tip by the structure of the extendable arm itself, without using flexible hoses or using only very short lengths of flexible hose.

Examples of applications of the device in accordance with the invention include various operations that have to be carried out on slabs of hot metal produced by continuous casting and any operation entailing use of a torch in a dangerous environment.

There is claimed:

1. Gas torch comprising:
   (1) a body having at a first end thereof adjuster valves for connection to fluid supplies and at a second end thereof a torch tip,
   (2) a support at the first end of said body from which said body extends to said torch tip, and wherein said body has sections of rigid tubes connected to articulation and fluid passage connection means, whereby said sections of rigid tubes are articulated and connected to each other to provide continuity of fluid communication between said sections of rigid tubes,
   (3) an articulation and fluid passage connection means attached to said support and said sections of tubes near said support, whereby said sections of tubes are articulated and connected to said adjuster valves, and
   (4) maneuvering means articulated to said support and to at least said sections of tubes near said support so as to provide remote displacement of said tip which is adapted to be supplied with fluid by at least some of said sections of tubes.

2. Torch according to claim 1, having a further articulation and fluid passage connection means, whereby said sections of tubes near said tip are articulated to said tip.

3. Torch according to claim 2, further having two actuators connected to two of said sections of tubes, and wherein said tip is connected to a further articulation and fluid passage connection means.

4. Torch according to claim 1, wherein said sections of tubes constitute a series of first branches connected to each other and a series of second branches connected to each other and each branch having pivot pins connecting each branch for articulation of each branch, and fluid passage connection means in at least one of said series of branches, whereby said first and second series of branches are articulated near the central portion thereof so as to form deformable parallelograms, guide means and displacement means associated with said support, a movable element movable along said guide means by said displacement means, and an articulation means near said support and connected to one series of branches, whereby the branches are articulated by an articulation and fluid passage connection means so as to enable the branches to be connected to said adjuster valves.

5. Gas torch comprising a body, a tip disposed at one end of said body, a support disposed at the other end of said body, a guide means fixed to said support and having displacement means associated therewith, at least one movable element displaceable along said guide means by said displacement means, said body having extendable multiple branches and rotary joints connecting each branch whereby said branches are articulated in the form of deformable parallelograms and wherein one branch is articulated to said movable element and the other branch is articulated to a fixed point near said support, and wherein at least one of the articulated branches has at its end near the support a rotary joint adapted to be connected to adjuster valves which are in turn connected to at least one fluid supply and another of said articulated branches having at its end remote from said support an end rotary joint through which said another branch is articulated to said tip.

6. Torch according to claim 5, wherein said branches are constituted by tubes and each of said rotary joints comprises a central shaft and two sleeves mounted to rotate freely on said central shaft, said sleeves having on their inside surface as many annular grooves as there are tubes constituting a branch, internal passages disposed in said sleeves with terminations thereof on said sleeves for connecting said tubes, said grooves in each of said sleeves being coupled by said internal passages to said terminations, and longitudinal passages inside said central shaft whereby said grooves of said two sleeves are respectively connected to each other.

7. Torch according to claim 5, wherein said branches are constituted by tubes and each of said rotary joints comprises a central shaft and as many plates mounted to rotate freely thereon as there are tubes constituting a branch, each of said plates having an annular groove on its inside surface and a termination of the groove for connecting a tube, an internal passage in each of said plates joining said annular groove and said termination, and longitudinal passages in said central shaft whereby said grooves in one half of said plate are connected to corresponding grooves in the other half of the same plate.

8. Torch according to claim 1, having a cylinder on which said support is mounted so as to be able to turn about the geometrical axis of said cylinder, a plinth supporting said cylinder and a motor operably coupled to said support so as to rotate it about said cylinder.

9. Torch according to claim 8, having a carrier member on which said support is mounted and wherein said carrier is mounted on said cylinder such that said support is movable on said carrier member in a direction parallel to said cylinder.

10. Torch according to claim 1 wherein there is a plurality of said maneuvering means, each of which has a first end articulated to said support and each of which has a second end articulated to different said sections of rigid tubes, and the number of maneuvering means being the same as the number of said sections of tubes which are articulated and connected to each other.

* * * * *